United States Patent [19]
Glance et al.

[11] Patent Number: 5,542,010
[45] Date of Patent: Jul. 30, 1996

[54] RAPIDLY TUNABLE WIDEBAND INTEGRATED OPTICAL FILTER

[75] Inventors: Bernard Glance, Colts Neck; Robert W. Wilson, Holmdel, both of N.J.

[73] Assignee: AT&T Corp., Murray Hill, N.J.

[21] Appl. No.: 492,356

[22] Filed: Jun. 19, 1995

Related U.S. Application Data

[63] Continuation of Ser. No. 19,957, Feb. 19, 1993, abandoned.

[51] Int. Cl.$^6$ .............................. G02B 6/12; H04J 14/00
[52] U.S. Cl. ........................... 385/14; 385/15; 385/24; 385/37; 385/42; 385/46; 385/132; 359/115; 359/117; 359/578; 359/579; 359/890
[58] Field of Search ....................... 359/890, 578, 359/589, 109, 113, 114, 115, 117, 127, 128; 385/15, 24, 37, 14, 17, 31, 39, 42, 46, 47, 129, 130, 131, 132

[56] References Cited

U.S. PATENT DOCUMENTS

| | | | |
|---|---|---|---|
| 4,244,045 | 1/1981 | Nosu et al. | 359/129 |
| 4,960,310 | 10/1990 | Cushing | 359/888 |
| 4,969,043 | 11/1990 | Pothier | 358/213.27 |
| 5,002,350 | 3/1991 | Dragone | 359/124 |
| 5,051,590 | 9/1991 | Kern et al. | 250/339 |
| 5,136,671 | 8/1992 | Dragone | 385/46 |
| 5,339,157 | 8/1994 | Glance et al. | 385/24 |
| 5,341,444 | 8/1994 | Henry et al. | 385/11 |
| 5,367,586 | 11/1994 | Glance et al. | 385/24 |
| 5,373,516 | 12/1994 | Glance et al. | 372/20 |
| 5,373,517 | 12/1994 | Dragone et al. | 372/20 |
| 5,390,200 | 2/1995 | Zirngibl | 372/20 |
| 5,414,548 | 5/1995 | Tachikawa et al. | 359/130 |
| 5,461,685 | 10/1995 | Glance et al. | 385/24 |
| 5,488,680 | 1/1996 | Dragone | 385/24 |

FOREIGN PATENT DOCUMENTS

| | | | |
|---|---|---|---|
| 58-129849 | 8/1983 | Japan | 385/37 X |
| 0478391 | 9/1991 | Japan | 385/14 X |
| 0496348 | 1/1992 | Japan | 385/14 X |
| 04178613 | 6/1992 | Japan | 385/14 X |

OTHER PUBLICATIONS

"FDM–FSK Star Network With a Tunable Optical Filter Demultiplexer," I. P. Kaminow, et al., Electronics Letters, vol. 23, No. 21, Oct. 8, 1987, pp. 1102–1103.
"An N×N Optical Multiplexer Using a Planar Arrangement of Two Star Couplers," IEEE Photonics Technology Letters, vol. 3, No. 9, Sep. 1991, pp. 812–815.
"Applications of the Integrated Waveguide Grating Router", Journal of Lightwave Technology, vol. 12, No. 6, Jun. 1994, pp. 957–962.
"High Performance Optical Waveguide Shifter," Electonics Letters, vol. 28, No. 18, Aug. 27, 1992, pp. 1714–1715.

*Primary Examiner*—Brian Healy
*Attorney, Agent, or Firm*—Eugene S. Indyk

[57] ABSTRACT

A monolithically integrated wideband optical filter which is rapidly tunable to a large number of optical frequencies over a wide optical frequency range comprises two series connected optical filters of different resolutions formed in a semiconductive wafer. A control circuit applies electrical energy to predetermined controllably transmissive waveguides connecting components of the filters defined in the wafer. This tunes the overall filter to a desired one of a plurality of optical frequencies. Application of such electrical energy creates frequency selective pathways through the wafer able to pass one of up to hundreds of selected optical frequencies over the entire bandwidth of a semiconductive medium. This filter is economical to construct and is useful in high capacity, high speed optical communications networks.

17 Claims, 3 Drawing Sheets ns patent 5,542,010

RAPIDLY TUNABLE WIDEBAND INTEGRATED OPTICAL FILTER

This application is a continuation of application Ser. No. 08/019,957, filed on Feb. 19, 1993, now abandoned.

CROSS-REFERENCE TO RELATED APPLICATIONS

This application is related to application Ser. No. 08/019,961 of Bernard Glance and Robert Wilson, entitled "Rapidly Tunable Integrated Optical Filter," filed in the Patent and Trademark Office on the same day this application is being filed, and now U.S. Pat. No. 5,339,157.

This application is related to application Ser. No. 08/019,952 of Corrado Dragone and Ivan P. Kaminow entitled "Rapidly Tunable Integrated Laser," filed in the Patent and Trademark Office on the same day this application is being filed, and now U.S. Pat. No. 5,373,517.

This application is related to application Ser. No. 08/019,951 of Bernard Glance and Robert Wilson, entitled "Rapidly Tunable Wideband Integrated Laser," filed in the Patent and Trademark Office on the same day this application is being filed, and now U.S. Pat. No. 5,373,516.

TECHNICAL FIELD

This invention relates to optical communications systems. More particularly, this invention relates to filters used in optical communications systems.

BACKGROUND

The capacity and speed of communications systems may be increased by transmitting information in optical form over networks composed of optically transmissive nodes, fibers, waveguides, and the like. High capacity optical communications systems require that many optical signals be frequency division multiplexed in the components of an optical network. This requires that there be a way of conveniently detecting a single electromagnetic frequency and separating it from a plurality of multiplexed electromagnetic frequencies. An ideal device for detecting a single optical frequency and separating it from a plurality of multiplexed frequencies is a frequency selective optical filter. Until now, there has been no convenient approach to creating a suitable optical filter tunable to a large number of optical frequencies. The performance of prior filters has been limited in terms of tuning speed, frequency selectivity, or tuning range. All of these prior devices also have been expensive to implement.

SUMMARY

U.S. patent application Ser. No. 08/019,961, now U.S. Pat. No. 5,339,157, of Glance and Wilson entitled Rapidly Tunable Integrated Optical Filter describes a rapidly tunable optical filter fabricated with wide gain bandwidth photonic integrated circuitry. The filter described in the application uses 1×N frequency routing devices such as the multiplexer/demultiplexer devices described in U.S. Pat. Nos. 5,002,350 and 5,136,671. This filter is rapidly tunable to up to N discrete optical frequencies, where N is the number of branches of the frequency routers used in the filter.

Applicants have found that the number of discrete frequencies to which a filter using frequency routing devices may be dramatically increased by utilizing the periodic routing properties of the frequency routing devices like the ones described in the patents mentioned above. For example, the number of discrete frequencies to which such a filter may be tuned may be up to $N^2$. A filter in accordance with this invention thus will be able to detect optical frequencies ranging across the entire bandwidth of the semiconductor material used in photonic communications networks. A filter in accordance with this invention will also avoid the possibility of tuning to multiple indistinguishable frequencies separated by a free spectral region defined by the characteristics of the frequency routing devices used in the filter.

In one example of this invention, a wideband filter takes advantage of the periodic routing properties of frequency routing devices to provide detection of a set of discrete frequencies equal to the square of the number of branches associated with the frequency routing devices. Such frequency routing devices of modest size can be used to build optical filters tunable to hundreds of frequencies. Each of these filters may comprise two cascaded optical filters constructed in accordance with the principles of the previously mentioned application of Glance and Wilson. One of the filters is a high resolution filter and the other of the filters is a low resolution filter. Each filter comprises two 1×N frequency routing devices connected in series by their N branches. An active section, integrated into each of these N branches, is used selectively as either an optical amplifier or a gate. Activation of selected ones of these sections provides a frequency selective route between the input and the output of the filter.

The first filter yields high resolution passbands; the second filter yields low resolution passbands each overlapping one of a group of periodic sets of N high resolution passbands created by the first filter. Activation of predetermined ones of the optical amplifiers selects a particular high resolution passband between an input and an output of the wideband filter in accordance with this invention. Any of $N^2$ consecutive high resolution passbands $\Delta F$ wide can be selected over a tuning bandwidth $N^2 \Delta F$, which may encompass the entire bandwidth of semiconductive material used in photonic communications networks.

Tuning of the filter may be done digitally by gating predetermined active sections by using an electrical switch to apply bias current to those predetermined sections. The filter is insensitive to the level of bias current supplied to the gates and thus can be expected to be very stable. Switching between frequencies can be potentially made at nanosecond speeds by using fast electrical switches.

This is only an example of the invention. The full scope of the invention entitled to an exclusionary right is set forth in the claims at the end of this application.

DETAILED DESCRIPTION

Figure 1:
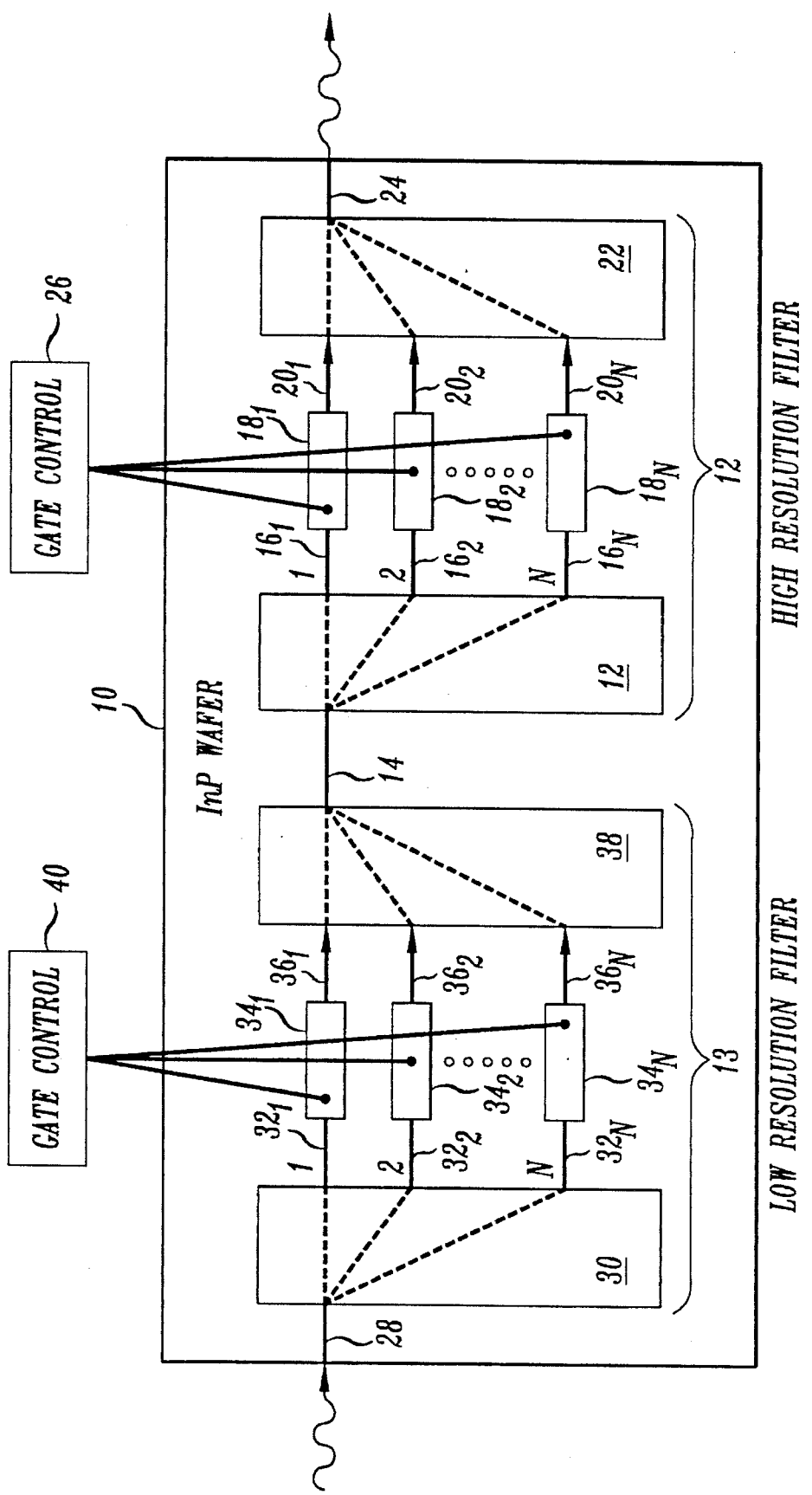
FIG. 1 is a diagram of an example of a wideband tunable filter in accordance with this invention.

FIG. 1 shows an example of an optical filter which is rapidly tunable over a wide frequency range. It is composed of a high resolution optical filter and a low resolution optical filter both containing integrated frequency routing devices. It is also composed of a number of waveguides for carrying optical signals and a number of optically active sections for providing optical amplification. These structures may be monolithically integrated on a semiconductive wafer. They may be created by means of known photolithographic techniques.

FIG. 1 illustrates a wafer 10 made of a semiconductive material such as an indium phosphide material such as InGaAsP. A 1×N frequency routing device 12 may receive N multiplexed input optical frequencies $F_1, F_2, \ldots, F_N$ on a single input waveguide 14 defined on the wafer 10. The frequency routing device 12 demultiplexes the input optical frequencies and directs each one of those frequencies into a separate output waveguide connected to the output of the frequency routing device 12. Specifically, frequency $F_1$ is directed to the output waveguide $16_1$, frequency $F_2$ is directed to the output waveguide $16_2$, and so on up to frequency $F_N$ which is directed to output waveguide $16_N$. Each of the output waveguides $16_1, 16_2, \ldots, 16_N$ is directed to the input of a doped section of waveguide with controllable optical transmissivity. Specifically in FIG. 1, an output waveguide $16_1$ is directed to the input of an optically active section $18_1$, an output waveguide $16_2$ is directed to the input of an optically active section $18_2$, and so on up to an output waveguide $16_N$ directed to the input of an optically active section $18_N$.

Figure 3:
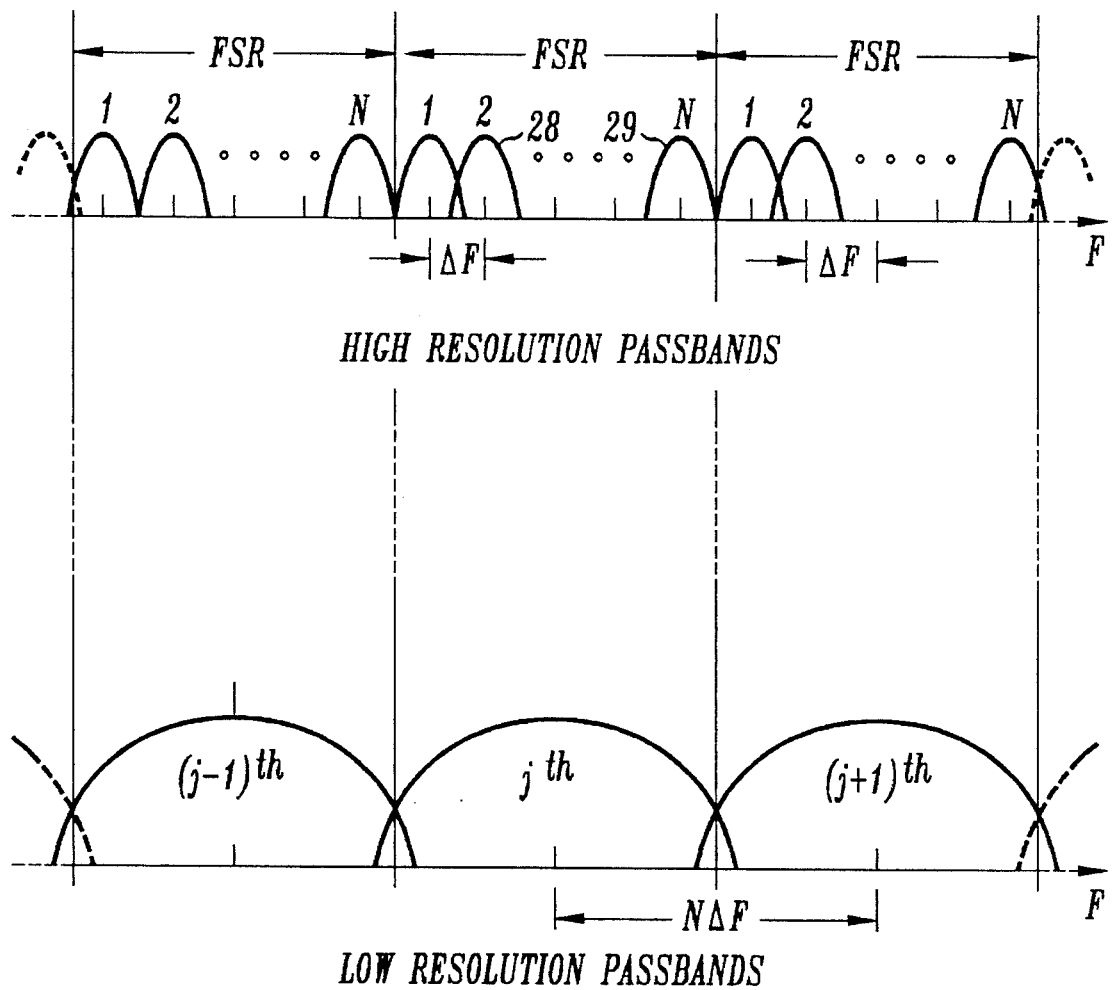
FIG. 3 shows the frequency characteristics of the high resolution filter and the low resolution filter shown in FIG. 1.

The outputs of the active sections $18_1, 18_2, \ldots, 18_N$ are connected to respective input waveguides $20_1, 20_2, \ldots, 20_N$ of a N×1 output frequency router 22. The frequency router 22 will multiplex the single frequencies appearing on the N input waveguides onto a single output waveguide 24, if all of the active sections between the input router 12 and the output router 22 are activated with electrical energy. If only one of the active sections is stimulated with electrical energy, then only the frequency flowing in that activated section will appear on the output waveguide 24. The device shown in FIG. 1 thus acts as an optical filter for the multiplexed input frequencies appearing on waveguide 14 when appropriate active sections are stimulated. Accordingly, a digital gate control circuit 26 is provided for the structure of FIG. 1 which selectively applies electrical energy to predetermined ones of the sections between the frequency routers so that unwanted frequencies in the input stream to the device of FIG. 1 may be suppressed and one or more desired frequencies may be obtained from the output of the device of FIG. 1. As shown in FIG. 3, the filter 12 in FIG. 1 is dimensioned to give high resolution passbands separated by a frequency interval $\Delta F$. There are periodic sets of such passbands identified as free space regions FSR in FIG. 3. Each of the sets of passbands comprises N passbands. The sets of passbands are thus spaced by an FSR of N$\Delta F$. These sets of passbands have the same routing properties through the filter 12.

The filter of FIG. 1 also includes a low resolution filter 13 which comprises an input waveguide 28 connected to a 1×N input frequency routing device 30. The device 30 has N output ports connected to respective ones of waveguides $32_1, 32_2, \ldots, 32_N$. The waveguides $32_1, 32_2, \ldots, 32_N$ are connected to one side of each of a plurality of optical amplifiers $34_1, 34_2, \ldots, 34_N$. The other side of each optical amplifier is connected to a respective one of a plurality of waveguides $36_1, 36_2, \ldots, 36_N$ which are, in turn, connected to respective input ports of an N×1 output frequency routing device 38. A single output port of the frequency routing device 38 is connected to the waveguide 14 which thus directs the output of the low resolution filter 13 to the input of the high resolution filter 12. The low resolution filter 13 operates in a manner similar to that of high resolution filter 12. It takes a plurality of multiplexed input frequencies received on waveguide 28 and produces a subset of those multiplexed frequencies within one free spectral range of the high resolution filter 12 on waveguide 14 depending upon which one of the optical amplifiers $34_1, 34_2, \ldots, 34_N$ is activated by a gate control circuit 40. The low resolution filter 13 is dimensioned to give low resolution passbands separated by a frequency interval of N$\Delta F$, as shown in FIG. 3. Each one of the low resolution passbands overlaps one of the set of passbands FSR associated with the high resolution filter 12, as also illustrated in FIG. 3. There are thus N high resolution passbands within a single low resolution passband associated with the filter 13.

Figure 4:
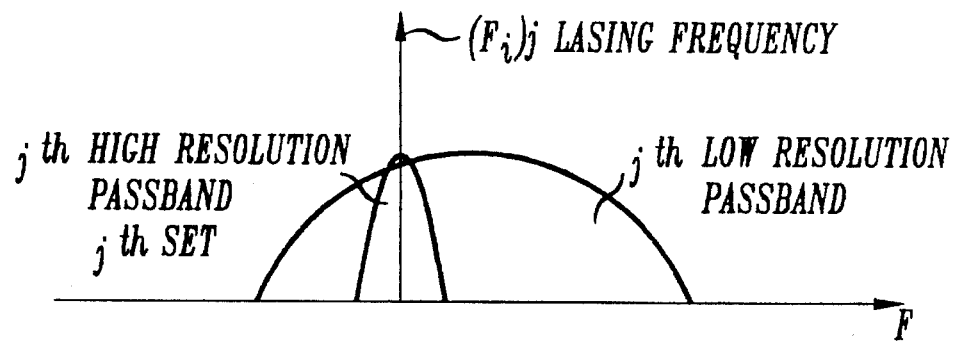
FIG. 4 illustrates a representative relationship between a low resolution passband and a high resolution passband to which the two filters in FIG. 1 must be respectively tuned so that the device of FIG. 1 is sensitive to a particular frequency $F_{i,j}$ which falls within both passbands.

Activation of the $i^{th}$ gate of the high resolution filter 12 and the $j^{th}$ gate of the low resolution filter 13 selects the $(i^{th})_j$ high resolution passband, as shown in FIG. 4, between the input and the output of the filter of FIG. 1. For example, if it is desired that the filter of FIG. 1 be tuned to a frequency within a passband given a reference number 28 in FIG. 3, then the $j^{th}$ optical amplifier $34_j$ is biased by the gate control circuit 40 and the others of the optical amplifiers between the frequency routing devices 30 and 38 are unbiased so as to select the $j^{th}$ passband associated with the low resolution filter 13. Also, the optical amplifier $18_2$ is biased by the gate control circuit 26 with the other optical amplifiers between the frequency routing devices 12 and 22 left unbiased in order to tune the filter of FIG. 1 to a frequency within the passband numbered 28 in FIG. 3. If it is the desired to tune the filter of FIG. 1 to a different frequency in a passband, such as passband numbered 29 in FIG. 3, associated with the high resolution filter 12, but in a different FSR, then the optical amplifier between frequency routing devices 30 and 38 which selects the appropriate low resolution passband overlapping the desired FSR associated with the high resolution filter 12 is activated and the others of those optical amplifiers are kept unbiased. If it is desired to tune the filter of FIG. 1 to a different passband associated with the high resolution filter 12, but within the same FSR, such as the passband numbered 29 in FIG. 3, then the single activated amplifier between the frequency routing devices 12 and 22 is changed as appropriate. The activation of the amplifiers between the devices 30 and 38 is left unchanged.

Tuning is done digitally by means of electrical switching. It is expected to be very stable and can be made to switch at nanosecond speeds by using a fast electrical switch. Such a filter in front of a conventional direct detection optical filter provides a means to realize an optical receiver tunable over a wide frequency range.

Each optical amplifier in the device of FIG. 1 comprises a doped section of waveguide with controllable optical transmissivity. The doping may be such that an appropriately configured semiconductor junction is defined in each optical amplifier. These sections are optically active in that application of electrical energy to those sections will cause them to become transmissive to the flow of optical energy and will even provide some degree of gain to optical signals flowing through them. These doped sections of waveguide are substantially opaque to the transmission of light when there is no applied electrical stimulation. The specially doped sections thus may be considered to be gates or optical amplifiers depending upon whether or not they are excited with electrical energy. The details of creating such sections in a wafer such as the indium phosphide wafer 10 shown in FIG. 1 are generally known, are not a part of this invention, and thus are not described here.

Figure 2:
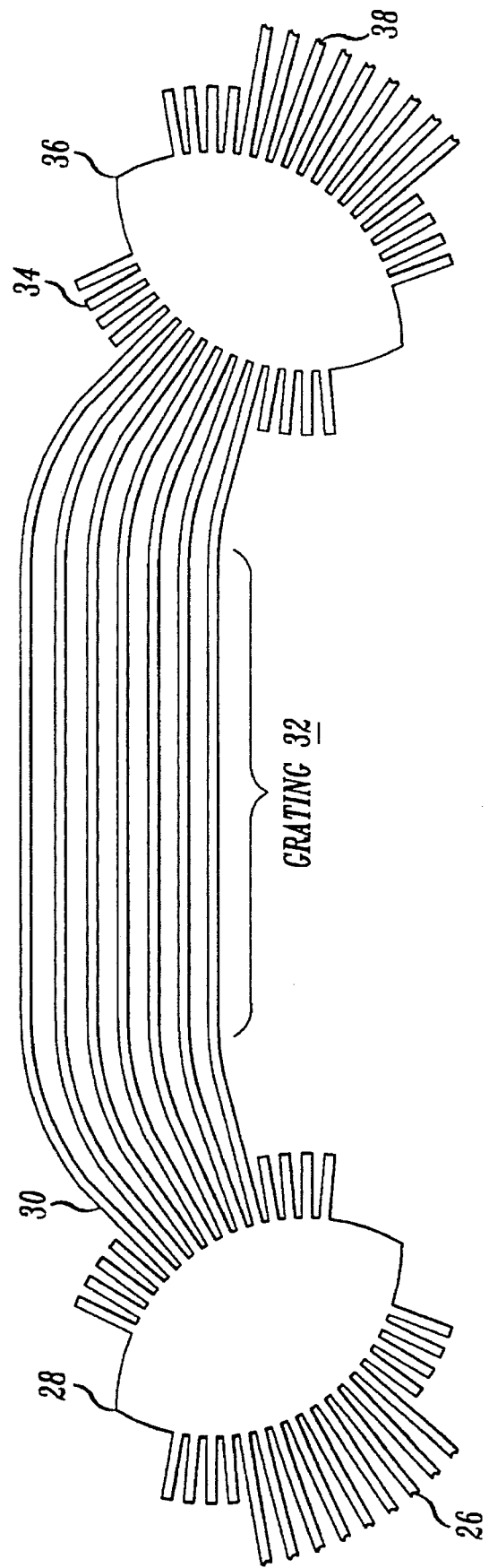
FIG. 2 is a diagram illustrating the details of the frequency routing devices shown in FIG. 1.

FIG. 2 shows the pertinent details of an example of a routing devices 12, 22, 30, and 38 shown in FIG. 1. Each frequency routing device contains a plurality of input waveguides 26 connected to a free space region 28. A plurality of output waveguides 30 extends from the free space region 28 and is connected to an optical grating 32. The optical grating 32 comprises a plurality of unequal length waveguides which provides a predetermined amount of path length difference between the output waveguides 30 and a corresponding plurality of input waveguides 34 connected to another free space region 36. The free space region 36 is connected to a plurality of output waveguides 38. These frequency routing devices operate as multiplexers and demultiplexers of optical frequencies. The details of their construction and operation are more fully described in the U.S. patents referred to above, the entire contents of which are hereby incorporated by reference into this application. In the case of the frequency routing device 12 in FIG. 1, one of the input waveguides 26 may be connected to the waveguide 14 and the output waveguides 38 may be connected to the waveguides $16_1, 16_2, \ldots, 16_N$. In the case of the frequency routing device 22 shown in FIG. 1, the input waveguides 26 may be connected to respective ones of the waveguides $20_1, 20_2, \ldots, 20_N$ shown in FIG. 1 and one of the output waveguides 38 may be connected to the waveguide 24 shown in FIG. 1. In the case of the frequency routing device 30, one of the input waveguides 26 may be connected to the waveguide 28 shown in FIG. 1. Respective ones of the output waveguides 38 may be connected to respective ones of the waveguides $32_1, 32_2, \ldots, 32_N$. In the case of the frequency routing device 38, respective ones of the input waveguides 26 may be connected to respective ones of the waveguides $36_1, 36_2, \ldots, 36_N$ shown in FIG. 1. One of the output waveguides 38 may be connected to the waveguide 14 shown in FIG. 1. The frequency resolution, namely, the width and spacing of the passbands shown in FIG. 3, of routing devices such as the device shown in FIG. 2 is determined by the geometry of the device, particularly, the magnitude of the path length differences provided by the optical grating 32 shown in FIG. 2.

The device of FIG. 1 may be tuned to a large number of different optical frequencies used in high speed, high capacity optical communications networks. For example, frequency routing devices with N up to 32 or more may be conveniently fabricated on a single semiconductive wafer. This results in a filter which can be tuned to any of up to $32^2$ or more optical frequencies. For example, assuming high and low resolution filters designed to give respective high and low resolution passbands separated by 50 GHz and 800 GHz, respectively, the device of FIG. 1 can be tuned to at least 256 discrete frequencies over a tuning range of 12,800 GHz (about 100 nm around a wavelength of 1.5 microns). The tuning range in this case is limited not by the size of the frequency routing devices but by the gain bandwidth of an active semiconductor medium. Devices such as the filter in FIG. 1 are attractive for large size optical network applications based on frequency division multiplexing.

We claim:

1. A tunable optical filter, comprising:

a first optical filter having a first frequency resolution formed in a semiconductive wafer; and a second optical filter having a second frequency resolution formed in the semiconductive wafer in series with the first optical filter;

in which each optical filter comprises an input frequency routing device in series with an output frequency routing device.

2. The optical filter of claim 1, in which the first resolution is greater than the second resolution.

3. The optical filter of claim 1 in which each input frequency routing device is capable of receiving a multiplexed plurality of optical frequencies on an input waveguide and routing each frequency to a respective one of a plurality of output waveguides.

4. The optical filter of claim 1 in which each output frequency routing device is capable of receiving a single optical frequency on each of a plurality of input waveguides and multiplexing those optical frequencies onto a single output waveguide.

5. The optical filter of claim 1, further comprising:

a plurality of waveguides connecting a plurality of outputs from each of the input frequency routing devices to a plurality of inputs of each of the output frequency routing devices;

each of the plurality of waveguides comprising a controllably transmissive section.

6. The optical filter of claim 5, further comprising:

a control circuit for selectively applying energy to the controllably transmissive sections for tuning the optical filter.

7. The optical filter of claim 1, in which each of the input frequency routing devices comprises:

at least one input waveguide;

a first free space region connected to the at least one input waveguide;

a plurality of output waveguides connected to the first free space region;

an optical grating connected to the plurality of output waveguides comprising a plurality of unequal length waveguides;

a plurality of input waveguides connected to the optical grating;

a second free space region connected to the plurality of input waveguides connected to the optical grating; and a plurality of output waveguides connected to the second free space region.

8. The optical filter of claim 1, in which each of the output frequency routing devices comprises:

a plurality of input waveguides;

a first free space region connected to the plurality of input waveguides;

a plurality of output waveguides connected to the first free space region;

an optical grating connected to the plurality of output waveguides comprising a plurality of unequal length waveguides;

a plurality of input waveguides connected to the optical grating;

a second free space region connected to the plurality of input waveguides connected to the optical grating; and at least one output waveguide connected to the second free space region.

9. A tunable optical filter, comprising:

a first optical filter capable of defining a first plurality of frequency passbands; and a second optical filter capable of defining a second plurality of frequency passbands;

one of the passbands in the second plurality of passbands overlapping in frequency a first group of the passbands in the first plurality of passbands; and another of the passbands in the second plurality of passbands overlapping in frequency a second group of the passbands in the first plurality of passbands.

10. The tunable optical filter of claim 9, in which the first optical filter comprises a first plurality of elements each for causing the first optical filter to define one of the first plurality of frequency passbands; and in which the second optical filter comprises a second plurality of elements each for causing the second optical filter to define one of the second plurality of frequency passbands.

11. The optical filter of claim 9, in which each optical filter comprises an input frequency routing device in series with an output frequency routing device.

12. The optical filter of claim 11 in which each input frequency routing device is capable of receiving a multiplexed plurality of optical frequencies on an input waveguide and routing each frequency to a respective one of a plurality of output waveguides.

13. The optical filter of claim 11 in which each output frequency routing device is capable of receiving a single optical frequency on each of a plurality of input waveguides and multiplexing those optical frequencies onto a single output waveguide.

14. The optical filter of claim 11, further comprising:

a plurality of waveguides connecting a plurality of outputs from each of the input frequency routing devices to a plurality of inputs of each of the output frequency routing devices;

each of the plurality of waveguides comprising a controllably transmissive section.

15. The optical filter of claim 14, further comprising:

a control circuit for selectively applying energy to a predetermined one or more of the controllably transmissive sections for tuning the optical filter to a predetermined one or more of the plurality of multiplexed optical frequencies received by the input frequency routing device.

16. The optical filter of claim 11, in which each of the input frequency routing devices comprises:

at least one input waveguide;

a first free space region connected to the at least one input waveguide;

a plurality of output waveguides connected to the first free space region;

an optical grating connected to the plurality of output waveguides comprising a plurality of unequal length waveguides;

a plurality of input waveguides connected to the optical grating;

a second free space region connected to the plurality of input waveguides connected to the optical grating; and a plurality of output waveguides connected to the second free space region.

17. The optical filter of claim 11, in which each of the output frequency routing devices comprises:

a plurality of input waveguides;

a first free space region connected to the plurality of input waveguides;

a plurality of output waveguides connected to the first free space region;

an optical grating connected to the plurality of output waveguides comprising a plurality of unequal length waveguides;

a plurality of input waveguides connected to the optical grating;

a second free space region connected to the plurality of input waveguides connected to the optical grating; and at least one output waveguide connected to the second free space region.

* * * * *